(12) United States Patent
Daniels et al.

(10) Patent No.: US 6,205,644 B1
(45) Date of Patent: Mar. 27, 2001

(54) METHOD OF ASSEMBLING AN ELECTRIC MOTOR

(75) Inventors: Nicholas R. Daniels, St. Louis; Donald E. Morgan, Florissant, both of MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 08/984,849

(22) Filed: Dec. 4, 1997

(51) Int. Cl.⁷ .................................................. H02K 15/02
(52) U.S. Cl. .................... 29/596; 29/732; 29/760
(58) Field of Search ................ 29/596, 732, 760

(56) References Cited

U.S. PATENT DOCUMENTS

| | | | |
|---|---|---|---|
| 2,377,965 | * | 6/1945 | Rataiczak ........................ 29/732 X |
| 3,165,816 | * | 1/1965 | Thompson et al. ................. 29/596 |
| 3,268,986 | * | 8/1966 | Lacy ............................... 29/596 |
| 3,413,715 | * | 12/1968 | Latussek et al. .................. 29/596 |
| 3,648,230 | * | 3/1972 | Younkin ........................ 340/27 NA |
| 4,793,054 | * | 12/1988 | Abbratozzato et al. ............ 29/596 |
| 5,412,270 | * | 5/1995 | Butcher et al. .................. 310/68 R |
| 5,533,815 | * | 7/1996 | Schierling et al. ............... 384/482 |
| 5,842,271 | * | 12/1998 | Kawasaki et al. ................. 29/732 |

\* cited by examiner

*Primary Examiner*—Carl E. Hall
(74) *Attorney, Agent, or Firm*—Harness, Dickey & Pierce, P.L.C.

(57) ABSTRACT

A method of assembling an electric motor by building the motor in one direction without the need to turn the motor end over end during the assembly process. The method includes providing a first housing section having motor control components preinstalled therein, and a shaft opening therein for the motor shaft; inserting the stator in the first housing section; temporarily inserting a jig into the stator to position the stator in the first housing section, and injecting a settable material between the stator and the first housing section to secure the stator within the first housing section. After the stator is secured, the jig is removed, and a rotor positioned in the stator, a fan is installed on the rotor, and a second housing section is interfit with the first housing section and the first and second housing sections are secured together.

2 Claims, 5 Drawing Sheets ic MOTOR

FIELD OF THE INVENTION

This invention relates to a method of assembling an electric motor, and in particular to a method of assembling a motor from one direction without the need to turn the motor end over end to complete the assembly process.

BACKGROUND OF THE INVENTION

Electric motors are typically assembled in a multiple step process in which a housing, end shields, a stator, a rotor, and control electronics are combined. During a typical assembly process a motor might be positioned several times as the various components are assembled. This manipulation of the motor during the assembly process can be tiring to the assembly workers, could cause handling damage, and is time consuming reducing the production rate.

SUMMARY OF THE INVENTION

The present invention relates to a method of assembling motors from one direction that eliminates the need to reposition the motor during the assembly process. This makes the assembly process faster and easier, and thus reduces assembly costs and the final cost of the motor.

Generally, the method of assembling a motor of the present invention comprises the steps of providing a first housing section, placing a stator in the first housing section, placing a jig in the stator in the first housing section to position the stator within the first housing section, and securing the stator in the first housing section. The stator is preferably secured by injecting a settable material between the stator and the first housing section. The assembly process is completed by removing the jig, installing a rotor in the stator, and interfitting a second housing section with the first housing section and securing the first and second housing sections together.

The first housing section has a shaft opening for the motor shaft, and the jig comprises a shaft adapted to extend through the bearing in the shaft opening in the first housing and a body adapted to closely fit within the stator to accurately position the stator in the first housing section relative to the bearing in the shaft opening.

The first housing section preferably has at least one motor control component preinstalled therein and electrical connections are made between the stator and the components. The assembly process of the present invention is simple, and allows a motor to be quickly assembled in one direction from one end to the other, without the need to reposition the motor. The process reduces handling damage and the amount of labor required to complete the motor thereby reducing the cost of the assembly process and of the assembled motor.

BRIEF DESCRIPTION OF THE DRAWINGS

Corresponding reference numerals indicate corresponding parts throughout the several views of the drawings.

DETAILED DESCRIPTION OF THE PREFERRED EMBODIMENT

Figure 1:
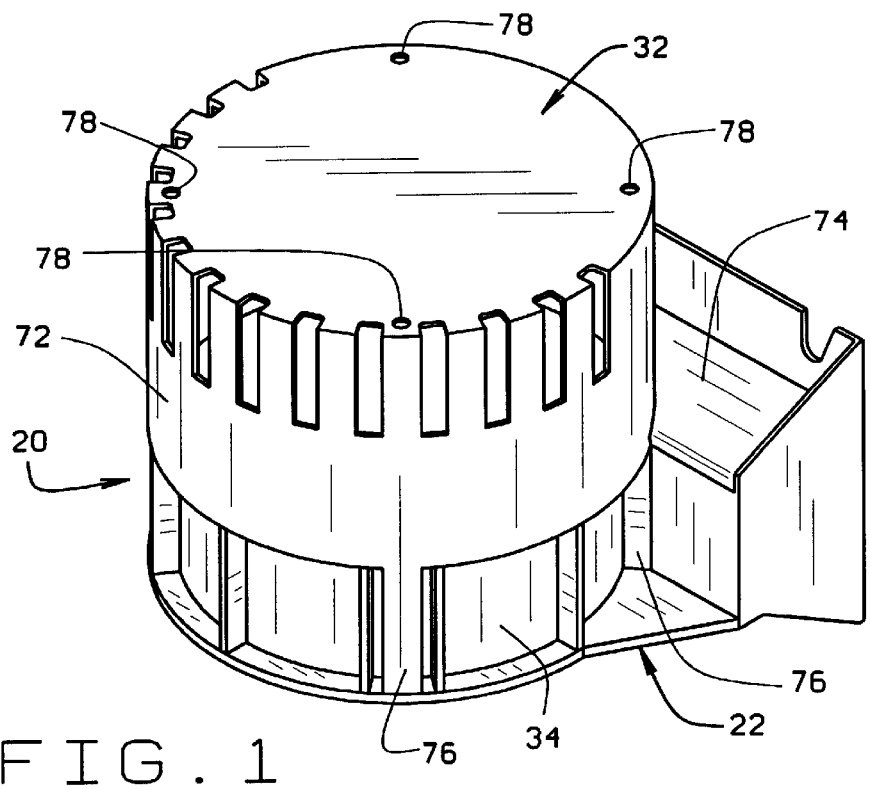
FIG. 1 is a perspective view of a motor assembled according to the principles of this invention.

A motor assembled according to the principles of the present invention is indicated generally as 20 in FIG. 1. The motor 20 described herein and shown in the figures is a jetted tub or spa motor, but this invention is not limited to this type of motor, and is applicable to any type of motor or dynamoelectric device. The components of the motor 20 are shown in FIG. 2, and comprise first housing section 22, bearing 24, stator 26, rotor 28, fan 30, and second housing section 32.

Figure 2:
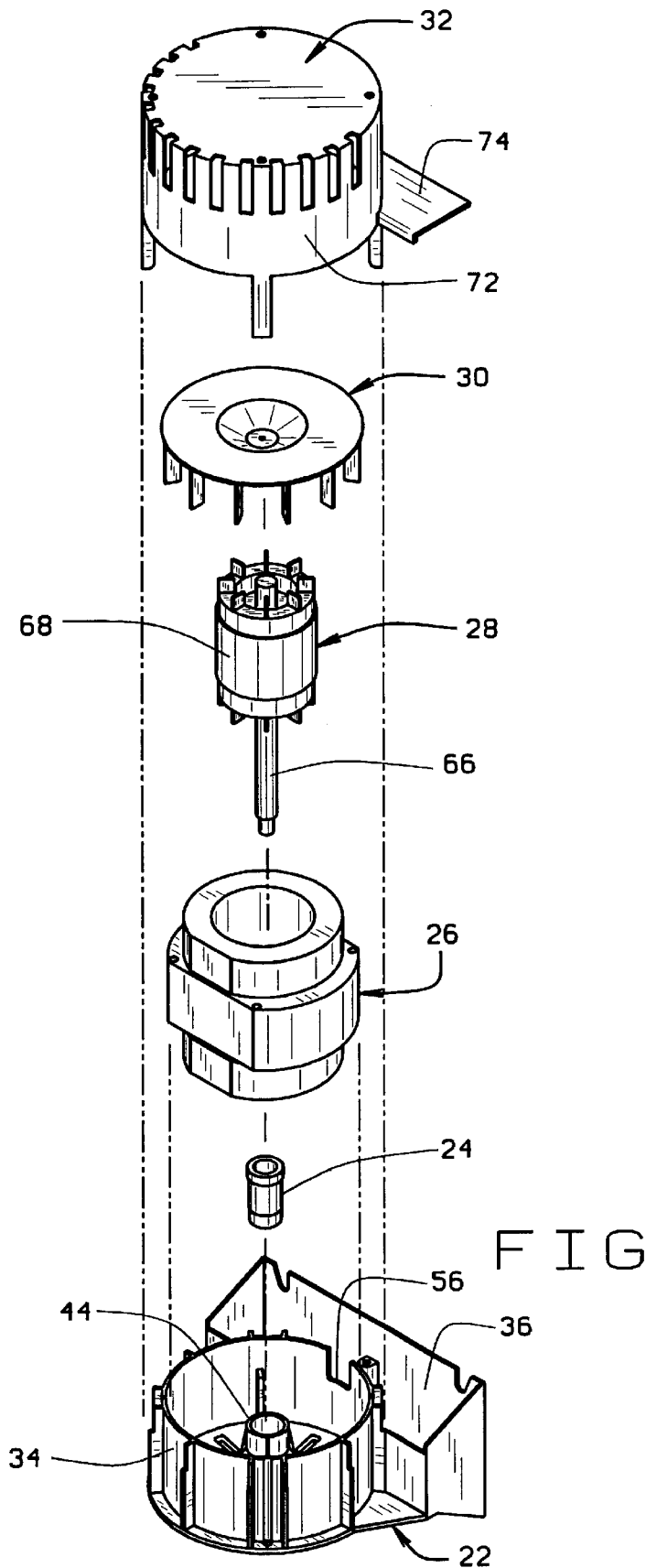
FIG. 2 is an exploded view of the motor, showing the arrangement of the parts.
Figure 4:
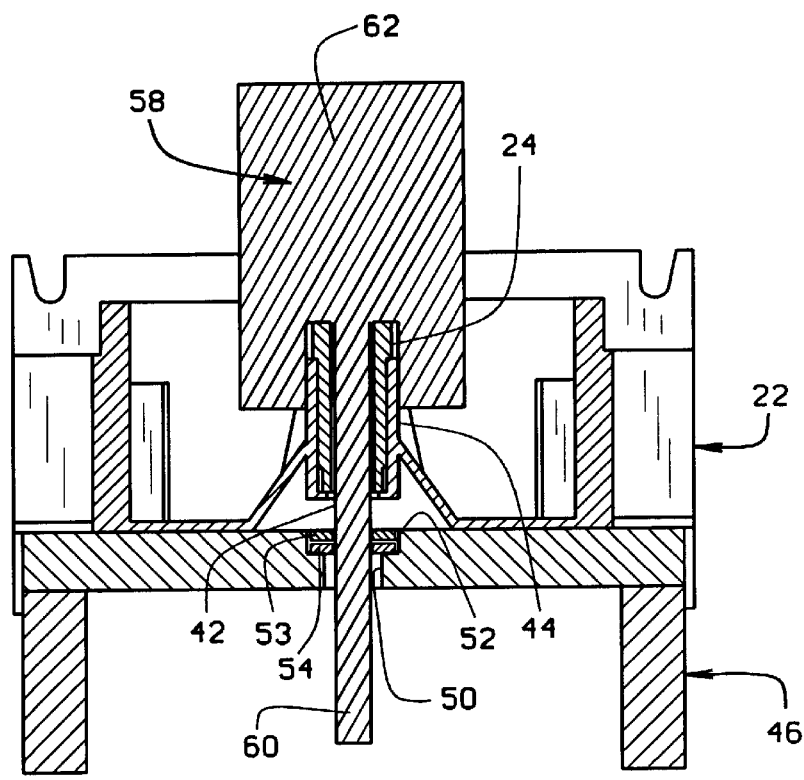
FIG. 4 is a vertical cross-sectional view of the first housing section seated on the fixture, with a stator placed therein.
Figure 8:
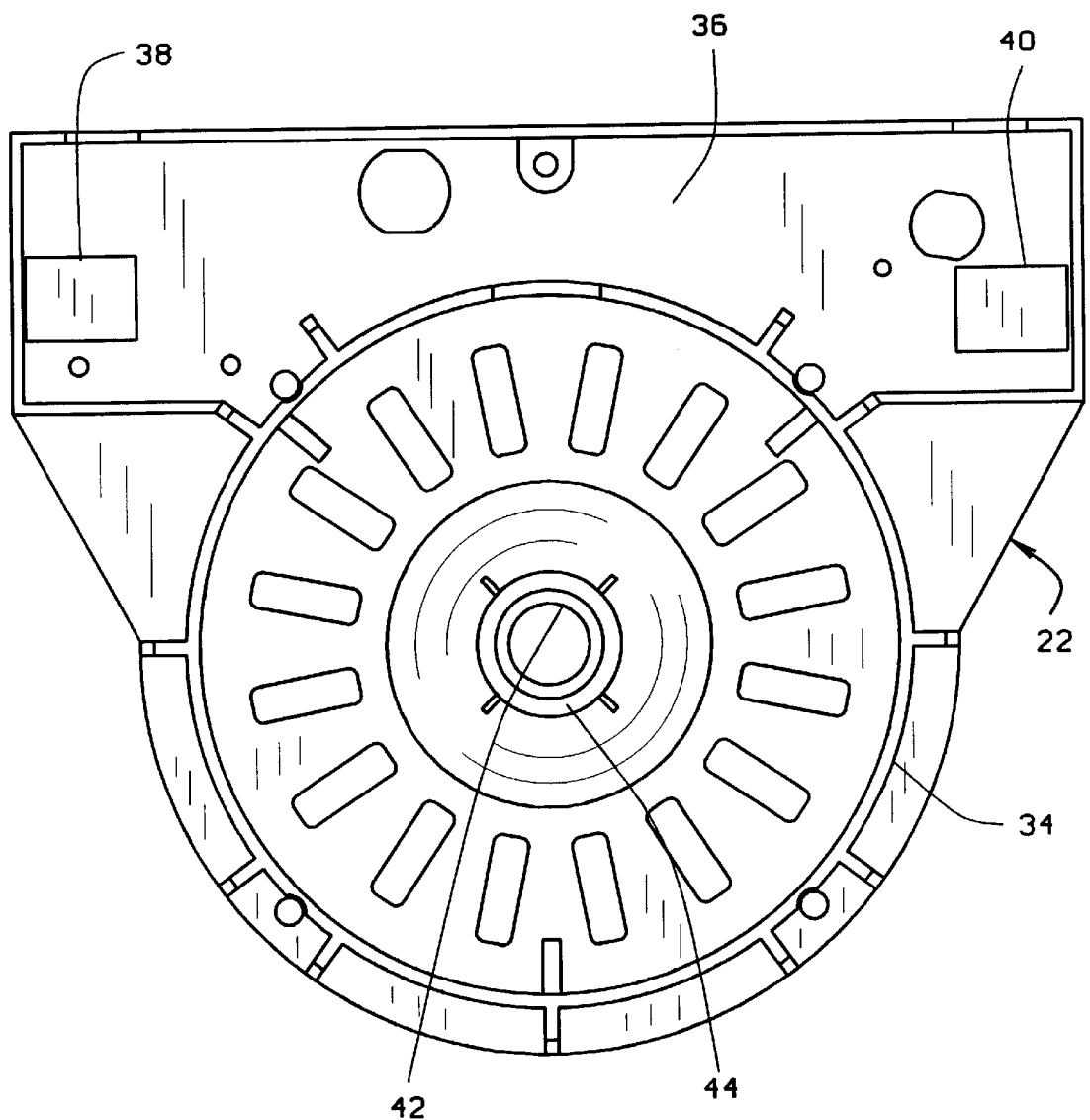
FIG. 8 is a top plan view of the first housing section.

As shown in the figures and particularly in FIG. 2, the first housing section 22 comprises a generally open cylindrical shell 34 for containing the moving parts of the motor 20, and an open compartment 36, adjacent to, but separate from the shell, for containing motor control components such as starting relay 38 and an air switch 40. (FIG. 8) Depending on the type of motor and its intended use these components may be removed or replaced, or additional components added. These control components are preferably preinstalled in the compartment 36 of the first housing section 22 before the assembly of the motor 20. There is a motor shaft opening 42 through the first housing section 22, this opening is surrounded by a sleeve 44 for the motor shaft. (FIG. 3) The bearing 24 mounts in the sleeve 44. The bearing 24 is preferably preinstalled in the sleeve 44 before the assembly of the motor, but the bearing could be installed in the sleeve 44 as part of the assembly process.

According to the method of the present invention, a fixture 46 (FIG. 3) is provided having a surface 48 adapted to interfit with the first housing section 22. The fixture 46 has a recess or opening 50 through the face 48, aligned with the shaft opening 42 in the first housing section 22 when the first housing section is properly seated on the surface 48. The fixture 46 preferably also has a seat 52 surrounding the recess 50, for receiving a slinger 53 and (optionally) a retainer 54. The slinger 53 is rubber ring that is placed on the shaft of a motor to block water from traveling along the shaft and into the motor. The slinger 53 would be left out of a motor that is not intended for use in a potentially wet environment. The retainer 54 is preferably an annular clip that engages a circumferential groove on the motor shaft.

Figure 3:
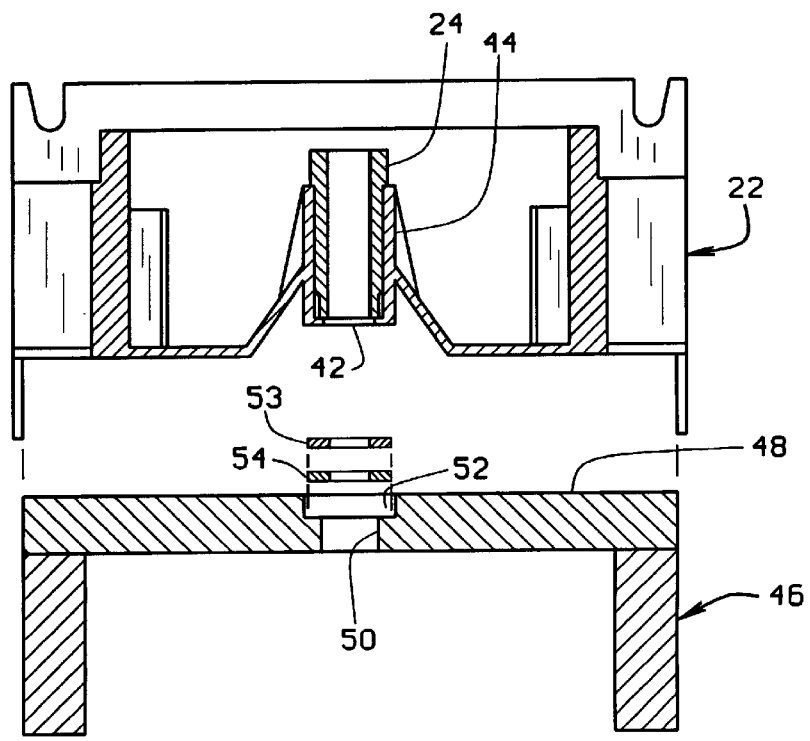
FIG. 3 is a vertical cross-sectional view showing the first housing section with a shaft bearing installed therein, and an assembly fixture.
Figure 5:
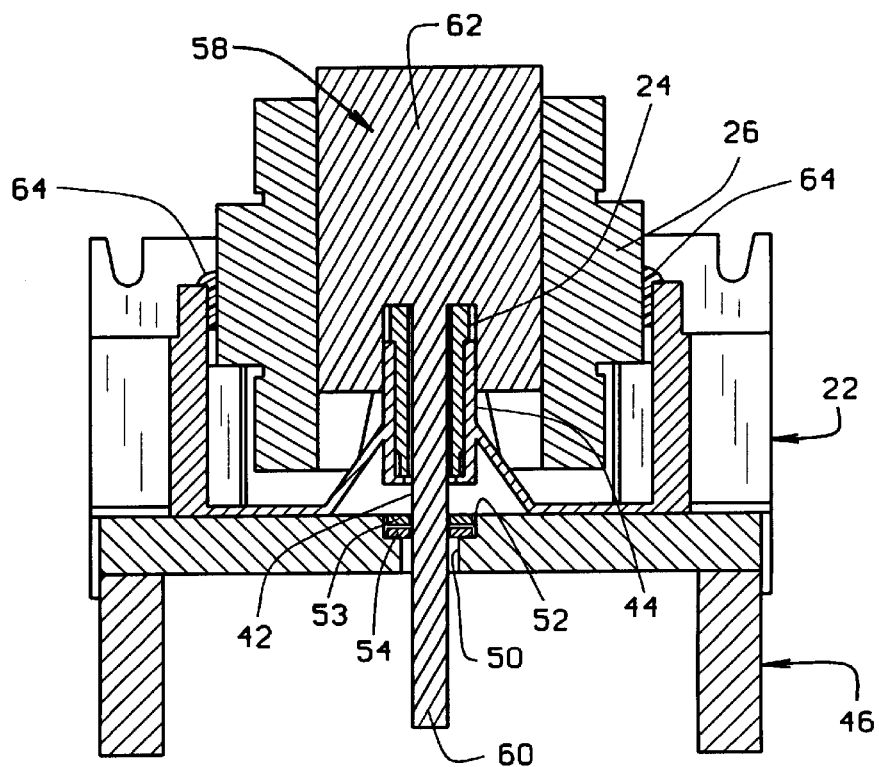
FIG. 5 is a vertical cross-sectional view of the first housing section and stator with the jig temporarily inserted therein to position the stator within the first housing section.

As shown in FIG. 3, the slinger 53 and/or the retainer 54 are placed in the seat 52 of the fixture 46, and the first housing section 22 is then seated on the fixture. As shown in FIG. 5, the stator 26 is then placed in the shell 34 of the first housing section 22. Electric connections are made between the stator 26 and the starting relay 38 and air switch 40 preinstalled in the compartment 36, with connector wires extending through a notch 56 between the shell 34 and the compartment. (FIG. 8) After the electrical connections are made with the starting relay 38 and air switch 40, a jig 58 (FIG. 5) is temporarily installed in the stator 26 in the first housing section 22. The jig 58 comprises a shaft 60, adapted to extend through the bearing 24 and sleeve 44, and through shaft opening 42, to securely position and orient the shaft 60. The jig 58 also comprises a body 62, adapted to fit closely within the stator 26, so that the jig accurately positions the stator within the first housing section 22 relative to the shaft opening 42. However the end of the shaft 60 is preferably sized so that it does not engage the slinger 53 or the retainer 54.

When the stator 26 is properly positioned in the first housing section 22, it is secured. This is preferably accomplished by injecting a settable material, such as an epoxy resin or a thermoplastic material, between the first housing section 22 and the stator 26. The settable material preferably has relatively fast setting time, so that the setting time does not unnecessarily prolong the assembly process. A A410-5 epoxy, available from Emerson & Cummings, and having setting time of 5 minutes at 300° F. or a UV cure 6-20410 adhesive available from Dymax have been found to be satisfactory although any suitable settable material could be used. It is not necessary to completely fill the space between the stator 26 and the first housing section 22, and a few beads 64 of settabble material at strategic locations around the perimeter of the stator 26 should be sufficient to secure the stator.

Figure 6:
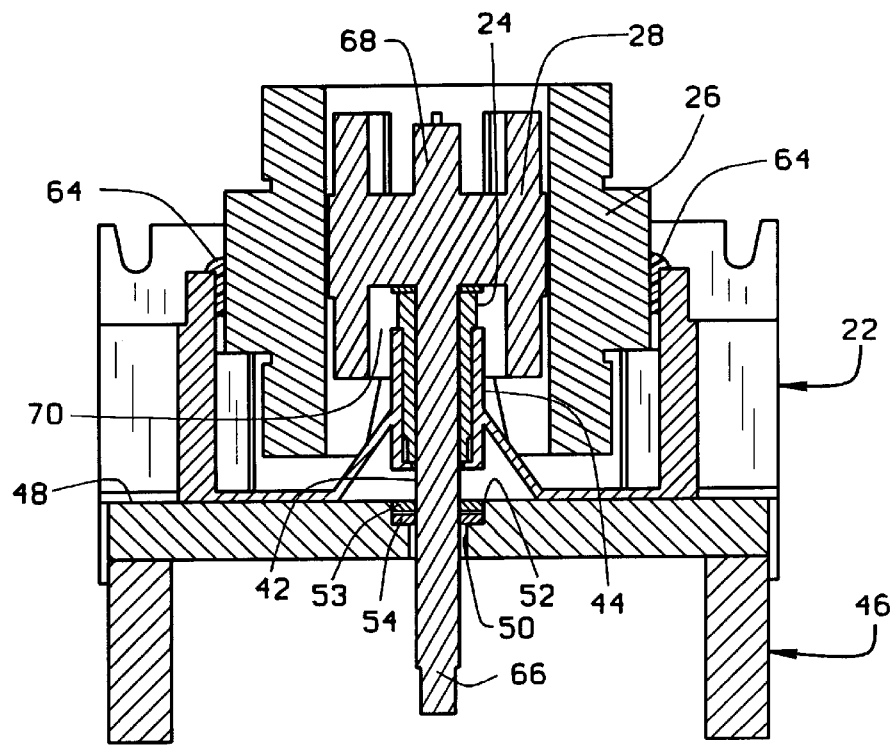
FIG. 6 is a vertical cross-sectional view of the first housing section, stator and rotor.

After the stator 26 is properly secured in the first housing section 22, the jig 58 is removed, and the rotor 28 is installed inside the stator, as shown in FIG. 6. The rotor 28 comprises a shaft 66 that is rotatably engaged in the bearing 24, extends through sleeve 44, and projects through the shaft opening 42 to form the motor shaft. The rotor also comprises a body 68 that rotates within the stator. The end of the shaft 66 that projects through the shaft opening 42 is larger than the end of the shaft 60 of the jig 58, and engages the slinger 53 and/or the retainer 54 in the seat 52 on the fixture 46. The slinger prevents water from traveling along the shaft 66 and the retainer 54 helps retain the rotor 28 in the first housing section 22.

The rotor 28 has a cylindrical recess 70 in one end surrounding the shaft 66. The recess 70 extends into the body 68 a sufficient distance to support the rotor, and in this preferred embodiment it extends at least half the length of the body 68. The recess receives the bearing 24 and sleeve 44, allowing the bearing to be positioned generally at the center of the body. This reduces cantilevered loads on the bearing, and allows the rotor to be rotatably mounted with a single bearing.

Figure 7:
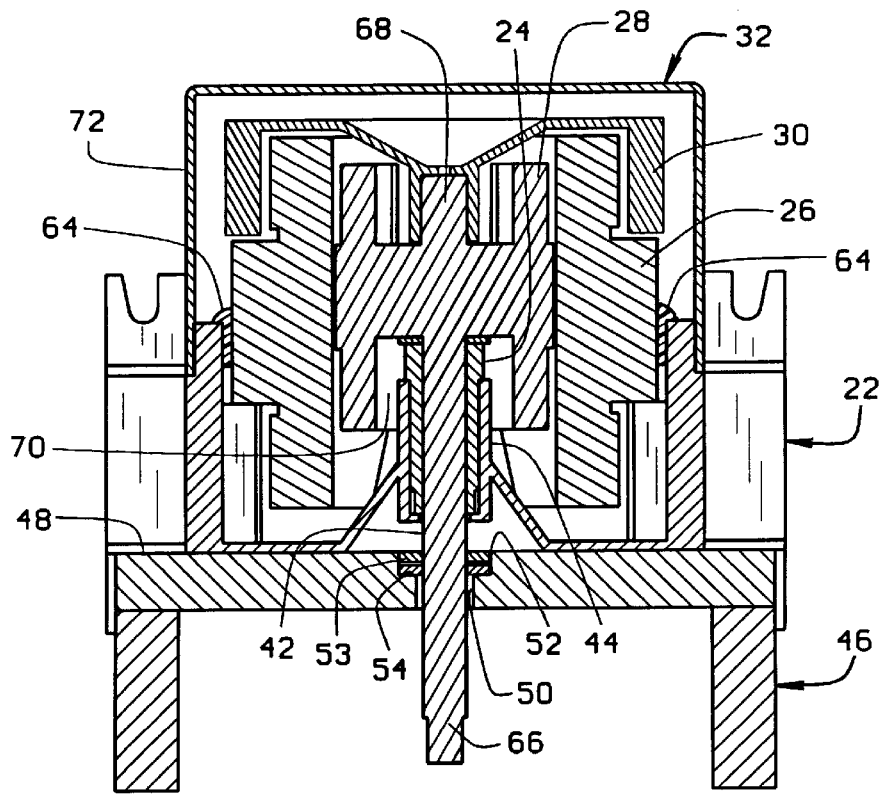
FIG. 7 is a vertical cross-sectional view of an assembled motor on the fixture.

In FIG. 7 a fan 30 is then interfit with the rotor 28 to turn with the rotor, and thereby draw air through the motor 20 as the rotor turns during operation of the motor. This helps cool the motor when in use. Finally, the second housing section 32 is interfit with the first housing section 22. The second housing section 32 comprises a shell 72, adapted to interfit with the shell 34 to enclosing the moving parts of the motor, and a lid 74, adapted to cover the compartment 36, and enclose the starting relay 38 and air switch 40 (FIG. 1). The second housing section 32 has legs 76 that extend from the shell 72 to the first housing section 22, and the second housing section is joined to the first housing section with long threaded connectors that extend through openings 78 in the shell 72 and through the legs 76.

OPERATION

A motor is quickly and easily assembled by placing a slinger 53 and/or a retainer 54 in the seat 52 on the fixture 46, and then seating the first housing section 22 on the fixture. A stator 26 is placed in the first housing section 22 and electrical connections are made with the electrical components 38 and 40 preinstalled in the first housing section. A jig 58 is inserted in the stator 26 in the first housing section 22 to accurately position the stator, and the stator is secured by injecting beads 64 of a settable material between the first housing section and the stator. After the settable material sets, the jig 58 is removed, and the rotor 28 is installed in the stator 26, with the shaft 66 of the rotor 28 projecting through the shaft opening 42 in the first housing section 22 and being engaged by the slinger 53 and/or retainer 54. The fan 30 is interfit with the rotor 28, and the second housing section 32 is interfit with the first housing section 22 to enclose the motor. The first and second housing sections 22 and 32 are secured together with fasteners, and the motor is completed and can be removed from the fixture.

The method of this invention thus provides for quick and easy assembly of an electric motor without the need for turning the motor end over end during the assembly process. The motor is simply build up from one end to the other. The process is simplified and the amount of labor is reduced, thereby reducing the ultimate cost of the motor.

What is claimed is:

1. A method of assembling a motor comprising:
   providing a first housing section the first housing section has a shaft opening therein for the shaft of the motor, providing a fixture having a surface for supporting the first housing section, the fixture having a passage that is aligned with the shaft opening in the first housing section when the first housing section is properly seated on the surface; placing a rotor shaft retainer on the surface of the fixture and subsequently positioning the first housing section on the fixture; placing a stator in the first housing section; placing a jig in the stator in the first housing section to accurately position the stator within the housing section; the retainer and the shaft on the portion of the jig that projects through the shaft opening being relatively sized so that the retainer does not lockably engage the jig but the retainer and the shaft on the rotor being relatively sized so that the retainer lockably engages the portion of the rotor that projects through the shaft opening; and securing the stator in the first housing section.

2. A method of assembling a motor comprising: providing a first housing section, the first housing section having a shaft opening therein for the shaft of the motor; providing a fixture having a surface for supporting the first housing section, the fixture having a passage that is aligned with the shaft opening in the first housing section when the first housing section is properly seated on the surface; placing a slinger on the surface of the fixture and subsequently positioning the first housing section on the fixture; placing a stator in the first housing section; placing a jig in the stator in the first housing section to accurately position the stator within the housing section; the slinger and the shaft on the portion of the jig that projects through the shaft opening being relatively sized so that the slinger does not engage the jig, but the slinger and the shaft on the rotor being relatively sized so that the slinger engages the portion of the rotor that projects through the shaft opening, and securing the stator in the first housing section.

* * * * *